United States Patent Office 3,514,459
Patented May 26, 1970

3,514,459
7-HYDROXY-3-AMINOALKYL-2-OXO-1,2-DIHYDROQUINOLINE ESTERS AND ETHERS
Heinrich Ritter, Dornigheim, Kreis Hanau, Rudi Beyerle, Bruchkobel, Kreis Hanau, and Rolf-Eberhard Nitz, Frankfurt am Main, Germany, assignors to Cessella Farbwerke Mainkur Aktiengesellschaft, Frankfurt am Main-Fechenheim, Germany
No Drawing. Continuation-in-part of application Ser. No. 584,665, Oct. 6, 1966, which is a continuation-in-part of application Ser. No. 356,318, Mar. 31, 1964. This application June 21, 1968, Ser. No. 738,773
Claims priority, application Germany, Apr. 2, 1963, C 29,545; June 26, 1963, C 30,282
Int. Cl. C07d 33/52
U.S. Cl. 260—287                            8 Claims

ABSTRACT OF THE DISCLOSURE

The present invention relates to derivatives of the 7-hydroxy-2-oxo-1,2-dihydroquinolines found to be particularly suitable for use as coronary artery dilators. Those derivatives found to be particularly useful for this purpose have the formula

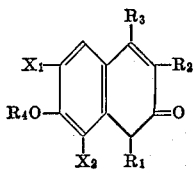

wherein $R_1$ is selected from the group consisting of hydrogen, methyl and ethyl;
$R_2$ is selected from the group consisting of β-piperidinoethyl, β-morpholinoethyl, β-pyrrolidinoethyl, β-[N-methyl-piperidyl (2)]-ethyl, β-(pyridyl-2)-ethyl, β-(pyridyl-4)-ethyl and dialkylaminoalkyl having the formula

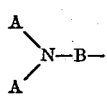

wherein

A is an alkyl radical that contains no more than 3 carbon atoms and
B is an alkylene radical containing 2–4 carbon atoms;
$R_3$ is selected from the group consisting of methyl, ethyl, propyl and phenyl;
$R_4$ is selected from the group consisting of allyl and alkoxycarbonylalkyl having the formula

wherein

D is methylene or ethylene and
E is an alkyl radical containing 2–4 carbon atoms
$X_1$ is hydrogen or bromine and
$X_2$ is hydrogen, chlorine or bromine.

The present application is a continuation-in-part of our United States Ser. No. 584,665, filed Oct. 6, 1966, now abandoned, which was in turn a continuation-in-part of our United States Ser. No. 356,318, filed Mar. 31, 1964, and now abandoned.

The present invention relates to new and therapeutically valuable derivatives of the 7-hydroxy-2-oxo-1,2-dihydroquinoline. The new derivatives of the 7-hydroxy-2-oxo-1,2-dihydroquinoline under the present invention may be represented by the general formula

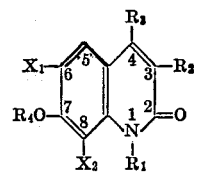

wherein $R_1$ is selected from the group consisting of hydrogen, methyl and ethyl;
$R_2$ is selected from the group consisting of β-piperidinoethyl, β-morpholinoethyl, β-pyrrolidinoethyl, β-[N-methyl-piperidyl (2)]-ethyl, β-(pyridyl-2)-ethyl, β-(pyridyl-4)-ethyl and dialkylaminoalkyl having the formula

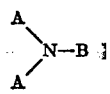

wherein

A is an alkyl radical that contains no more than 3 carbon atoms and
B is an alkylene radical containing 2–4 carbon atoms;
$R_3$ is selected from the group consisting of methyl, ethyl, propyl and phenyl;
$R_4$ is selected from the group consisting of allyl and alkoxycarbonylalkyl having the formula

wherein

D is methylene or ethylene and
E is an alkyl radical containing 2–4 carbon atoms
$X_1$ is hydrogen or bromine and
$X_2$ is hydrogen, chlorine or bromine.

The new derivatives of the 7-hydroxy-2-oxo-1,2-dihydroquinoline are obtained in the known methods by allowing 7-hydroxy-2-oxo-1,2-dihydroquinolines of the general formula

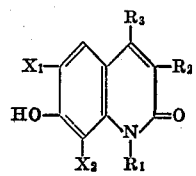

to react with alkylating agents appropriate for the introduction of the $R_4$-radical, especially halogen compounds of the general formula R₄-Hal in the presence of an acid-binding agent, or by condensing aminophenols of the general formula

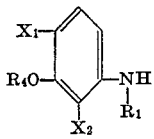

with β-keto-acid esters of the general formula

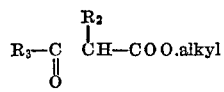

For the introduction of the R₄-radical there are appropriate, besides the compounds R₄-Hal, likewise other conventional alkylating agents, for example, unsaturated carboxylic acids or their functional derivatives respectively, lactones, lactames as well as suited sulfuric acid esters and the like.

The 7-hydroxy-2-oxo-1,2-dihydroquinolines required, inter alia, as initial products may be obtained according to known methods, by condensing correspondingly substituted β-keto-acid esters of the general formula

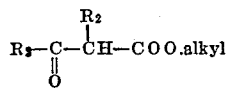

with aminophenols of the general formula

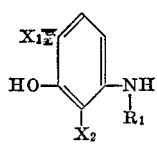

The 7-hydroxy-2-oxo-1,2-dihydroquinolines bearing halogen atoms and serving likewise as starting materials can be prepared according to known methods by halogenation of the corresponding 7-hydroxy-2-oxo-1,2-dihydroquinolines unsubstituted in 6- and 8-position. This causes the disubstitution to occur in 6- and 8-position and the monosubstitution in 8-position.

The derivatives of the 7-hydroxy-2-oxo-1,2-dihydroquinolines according to our present invention exhibit a very good and specifically coronary vasodilator action. In this respect they are by far superior to the natural products papaverine and khelline. They, therefore, are valuable therapeutics themselves but they may also be used as intermediates for the manufacture of therapeutical substances.

The comparative pharmacological tests of the substances with respect to their coronary vasodilator action were carried out in dogs according to the method disclosed by Eckenhoff, Hafkenschiel and Landmesser (Am. J. Physiol. 148, 582 (1947)). The test preparations were applied intracoronarily or intravenously to the animals narcotized. The coronary blood flow was measured by means of an automatic Bubble-Flow-Meter and the blood pressure was measured in the femoral artery by means of an Anderson-Glass-Capsule Manometer. During the test period the animals were given artificial respiration. On these test conditions the dilatation of the coronary artery caused by the test substance, gives rise to a more rapid bubble flow, whereas a constriction of the coronary vessels becomes evident from a retardation of the bubble flow, which is recorded by a kymograph. In all these tests papaverine was used as a comparative standard substance.

The following tables show the results obtained of the comparative tests:

TABLE I.—INTRACORONARY ADMINISTRATION

| Substance | Dosage, γ/kg. | Maximum increase in the coronary flow in percent | Duration of the action in minutes | Papaverine Dosage, γ/kg. | Maximum increase in the coronary flow in percent | Duration of the action in minutes |
|---|---|---|---|---|---|---|
| 3-(-β-diethylaminoethyl)-4-methyl-7-ethoxycarbonylmethoxy-2-oxo-1,2-dihydroquinoline-hydrochloride | 20 | 62 | ca. 40 | 10 | 65 | 2½ |
| 3-(-β-piperidinoethyl)-4-methyl-7-ethoxycarbonylmethoxy-2-oxo-1,2-dihydroquinoline hydrochloride | 10 | 21 | 25 | 10 | 31 | 4 |
| 3-(β-morpholinoethyl)-4-methyl-7-ethoxycarbonylmethoxy-2-oxo-1,2-dihydroquinoline hydrochloride | 10 | 77 | 35 | 10 | 46 | 2 |
| 1-ethyl-3-(β-piperidinoethyl)-4-methyl-7-ethoxycarbonylmethoxy-2-oxo-1,2-dihydroquinoline hydrochloride | 10 | 54 | 20 | 10 | 52 | 8 |
| 3-(β-diethylaminoethyl)-4-phenyl-7-ethoxycarbonylmethoxy-2-oxo-1,2-dihydroquinoline hydrochloride | 5 | 29 | 15 | 10 | 50 | 3 |
| 3-(β-diethylaminoethyl)-4-methyl-7-allyloxy-8-chloro-2-oxo-1,2-dihydroquinoline hydrochloride | 50 | 117 | 20 | 10 | 111 | 6 |
| 3-(β-diethylaminoethyl)-4-methyl-7-ethoxycarbonylmethoxy-8-chloro-2-oxo-1,2-dihydroquinoline hydrochloride | 10 | 35 | 30 | 10 | 28 | 6 |
| 3-(β-diethylaminoethyl)-4-methyl-7-ethoxycarbonylmethoxy-6,8-dibromo-2-oxo-1,2-dihydroquinoline hydrochloride | 20 | 68 | 40 | 10 | 63 | 5 |
| 3-(β-morpholinoethyl)-4-methyl-7-ethoxycarbonylmethoxy-8-bromo-2-oxo-1,2-dihydroquinoline hydrochloride | 5 | 58 | 20 | 10 | 63 | 3 |
| 3-(β-piperidinoethyl)-4-methyl-7-ethoxycarbonylmethoxy-8-bromo-2-oxo-1,2-dihydroquinoline hydrochloride | 10 | 27 | 20 | 10 | 28 | 4 |
| 3-(β-diethylaminoethyl)-4-methyl-7-ethoxycarbonylmethoxy-8-bromo-2-oxo-1,2-dihydroquinoline hydrochloride | 5 | 100 | 70 | 10 | 124 | 4 |
| 1-ethyl-3-(β-piperidinoethyl)-4-methyl-7-ethoxycarbonylmethoxy-8-bromo-2-oxo-1,2-dihydroquinoline hydrochloride | 10 | 35 | 15 | 10 | 42 | 4 |
| 1-methyl-3-(β-diethylaminoethyl)-4-methyl-7-ethoxycarbonylmethoxy-8-chloro-2-oxo-1,2-dihydroquinoline hydrochloride | 2.5 | 31 | 25 | 10 | 34 | 3 |
| Khelline | 10 | 29 | 1 | 10 | 81 | 4 |
| | 20 | 41 | 1½ | | | |

Comparative tests were also made under the same conditions as described hereinbefore but with intravenous administration of papaverine and the 7-hydroxy-2-oxo-1,2-dihydroquinoline derivatives according to the invention. The following table indicates the results obtained.

TABLE II.—INTRAVENOUS ADMINISTRATION

| Substance | Toxicity LD$_{50}$, g./kg. i.v. mouse | Dosage mg./kg. | Maximum increase in the coronary flow in percent | Duration of the action in minutes | Decrease in the mean blood pressure in mm. Hg |
|---|---|---|---|---|---|
| Papaverine | 0.026 | 0.8 | 23 | 10 | 30 |
| 3-(β-diethylaminoethyl)-4-methyl-7-ethoxycarbonylmethoxy-2-oxo-1,2-dihydroquinoline hydrochloride | 0.2 | 2.0 | 42 | 50 | 10 |
| 3-(β-piperidinoethyl)-4-methyl-7-ethoxycarbonylmethoxy-2-oxo-1,2-dihydroquinoline hydrochloride | 0.15 | 1.0 | 67 | 120 | 5 |
| 3-(β-morpholinoethyl)-4-methyl-7-ethoxycarbonylmethoxy-2-oxo-1,2-dihydroquinoline hydrochloride | 0.2 | 2.0 | 71 | 50 | 8 |
| 1-ethyl-3-(β-piperidinoethyl)-4-methyl-7-ethoxycarbonylmethoxy-2-oxo-1,2-dihydroquinoline hydrochloride | 0.022 | 2.0 | 52 | 120 | 15 |
| 3-(β-diethylaminoethyl)-4-phenyl-7-ethoxycarbonylmethoxy-2-oxo-1,2-dihydroquinoline hydrochloride | 0.06 | 1.0 | 32 | 70 | 0 |
| 3-(β-diethylaminoethyl)-4-methyl-7-allyloxy-8-chloro-2-oxo-1,2-dihydroquinoline hydrochloride | 0.029 | 2.0 | 22 | 20 | 5 |
| 3-(β-diethylaminoethyl)-4-methyl-7-ethoxycarbonylmethoxy-8-chloro-2-oxo-1,2-dihydroquinoline hydrochloride | 0.18 | 2.0 | 117 | 180 | 20 |
| 3-(β-diethylaminoethyl)-4-methyl-7-ethoxycarbonylmethoxy-6,8-dibromo-2-oxo-1,2-dihydroquinoline hydrochloride | 0.2 | 2.0 | 22 | 40 | 3 |
| 3-(β-morpholinoethyl)-4-methyl-7-ethoxycarbonylmethoxy-8-bromo-2-oxo-1,2-dihydroquinoline hydrochloride | 0.18 | 2.0 | 31 | 60 | 10 |
| 3-(β-piperidinoethyl)-4-methyl-7-ethoxycarbonylmethoxy-8-bromo-2-oxo-1,2-dihydroquinoline hydrochloride | 0.044 | 2.0 | 37 | 70 | 5 |
| 3-(β-diethylaminoethyl)-4-methyl-7-ethoxycarbonylmethoxy-8-bromo-2-oxo-1,2-dihydroquinoline hydrochloride | 0.075 | 0.5 | 90 | 90 | 0 |
| 1-ethyl-3-(β-piperidinoethyl)-4-methyl-7-ethoxycarbonylmethoxy-8-bromo-2-oxo-1,2-dihydroquinoline hydrochloride | 0.04 | 0.5 | 10 | 60 | 10 |
| 1-methyl-3-(β-diethylaminoethyl)-4-methyl-7-ethoxycarbonylmethoxy-8-chloro-2-oxo-1,2-dihydroquinoline hydrochloride | 0.032 | 2.0 | 69 | 60 | 15 |
| 3-(β-piperidinoethyl)-4-ethyl-7-ethoxycarbonylmethoxy-2-oxo-1,2-dihydroquinoline hydrochloride | 0.07 | 1.0 | 78 | 80 | −17 |
| 3-[β-(pyridyl-4)-ethyl]-4-methyl-7-ethoxycarbonylmethoxy-2-oxo-1,2-dihydroquinoline hydrochloride | 0.03 | 2.0 | 69 | 55 | +3 |
| 3-[β-(pyridyl-2)-ethyl]-4-methyl-7-ethoxycarbonylmethoxy-2-oxo-1,2-dihydroquinoline hydrochloride | 0.046 | 2.0 | 55 | 15 | −11 |
| 3-[β-(N-methylpiperidyl-2)-ethyl]-4-methyl-7-ethoxycarbonylmethoxy-2-oxo-1,2-dihydroquinoline hydrochloride | 0.12 | 2.0 | 54 | 60 | +6 |
| 1-methyl-3-(β-piperidinoethyl)-4-methyl-7-ethoxycarbonylmethoxy-2-oxo-1,2-dihydroquinoline hydrochloride | 0.032 | 1.0 | 69 | 60 | −5 |
| 3-(γ-diethylaminopropyl)-4-methyl-7-ethoxycarbonylmethoxy-2-oxo-1,2-dihydroquinoline hydrochloride | 0.135 | 2.0 | 20 | 30 | −4 |
| 3-(β-diethylaminopropyl)-4-methyl-7-ethoxycarbonylmethoxy-2-oxo-1,2-dihydroquinoline hydrochloride | 0.0975 | 2.0 | 28 | 40 | −15 |
| 3-(β-diethylaminoethyl)-4-methyl-7-[α-(ethoxycarbonyl)-ethoxy]-2-oxo-1,2-dihydroquinoline hydrochloride | 0.08 | 2.0 | 15 | 30 | −5 |
| 3-(β-diethylaminoethyl)-4-propyl-7-ethoxycarbonylmethoxy-2-oxo-1,2-dihydroquinoline hydrochloride | 0.11 | 2.0 | 88 | 60 | −10 |
| 3-(β-diethylaminoethyl)-4-methyl-7-isopropoxycarbonylmethoxy-2-oxo-1,2-dihydroquinoline hydrochloride | 0.095 | 2.0 | 46 | 85 | +3 |
| 3-(β-diethylaminoethyl)-4-methyl-7-isobutoxycarbonylmethoxy-2-oxo-1,2-dihydroquinoline hydrochloride | 0.14 | 2.0 | 35 | 60 | +7 |
| 3-(β-diethylaminoethyl)-4-methyl-7-[α-(ethoxycarbonyl)-ethoxy]-8-bromo-2-oxo-1,2-dihydroquinoline hydrochloride | 0.26 | 2.0 | 61 | 60 | +5 |
| 3-(β-piperidinoethyl)-4-ethyl-7-ethoxycarbonylmethoxy-8-bromo-2-oxo-1,2-dihydroquinoline hydrochloride | 0.018 | 2.0 | 90 | 80 | −21 |
| 1-methyl-3-(β-piperidinoethyl)-4-methyl-7-ethoxycarbonylmethoxy-8-bromo-2-oxo-1,2-dihydroquinoline hydrochloride | 0.018 | 2.0 | 83 | 100 | −3 |
| 3-(γ-dimethylamino-isobutyl)-4-methyl-7-ethoxycarbonylmethoxy-8-bromo-2-oxo-1,2-dihydroquinoline hydrochloride | 0.028 | 2.0 | 107 | 60 | +1 |
| 3-(β-isopropylaminoethyl)-4-methyl-7-ethoxycarbonylmethoxy-8-bromo-2-oxo-1,2-dihydroquinoline hydrochloride | 0.038 | 2.0 | 83 | 90 | −20 |
| 3-(β-pyrrolidinoethyl)-4-methyl-7-ethoxycarbonylmethoxy-8-bromo-2-oxo-1,2-dihydroquinoline hydrochloride | 0.06 | 2.0 | 69 | 60 | −2 |
| 3-(β-diethylaminopropyl)-4-methyl-7-ethoxycarbonylmethoxy-8-bromo-2-oxo-1,2-dihydroquinoline hydrochloride | | 2.0 | 76 | 60 | −11 |
| 3-(β-dimethylaminoethyl)-4-methyl-7-ethoxycarbonylmethoxy-8-bromo-2-oxo-1,2-dihydroquinoline hydrochloride | 0.11 | 2.0 | 82 | 20 | −30 |
| 3-(γ-diethylaminopropyl)-4-methyl-7-ethoxycarbonylmethoxy-8-bromo-2-oxo-1,2-dihydroquinoline hydrochloride | 0.05 | 2.0 | 69 | 140 | −16 |
| 1-methyl-3-(β-piperidinoethyl)-4-ethyl-7-ethoxy-carbonylmethoxy-8-bromo-2-oxo-1,2-dihydroquinoline hydrochloride | 0.048 | 2.0 | 74 | 80 | −26 |
| 3-(β-piperidinoethyl)-4-propyl-7-ethoxycarbonylmethoxy-8-bromo-2-oxo-1,2-dihydroquinoline hydrochloride | 0.01 | 2.0 | 138 | 70 | −11 |
| Khelline | 0.02 | 1.0 / 2.0 | 8 / 11 | 7 / 7 | −20 / −30 |

In the preparation of dragees and tablets containing as essential active ingredient the 7-hydroxy-2-oxo-1,2-dihydroquinoline derivatives of our invention these substances may be admixed with the conventional solid tabletting adjuvants, such as starch, lactose, talc and the like. Any of the tablesetting materials and carriers customary in pharmaceutical practice may be employed.

For the preparation of the injection solutions the salts of the basically substituted compounds are particularly suited since they have mostly a good water-solubility. Injection solutions of water-insoluble products may of course be prepared in the conventional manner by concurrently using well-known suspending agents, emulsifiers and/or solubilizers.

The following examples are given for the purpose of characterizing the substances of the present invention. All temperatures given are in degrees centigrade.

EXAMPLE 1

27.4 grams 3-(β-diethylaminoethyl)-4 - methyl-7-hydroxy-2-oxo-1,2 - dihydroquinoline (colourless crystals having a melting point of 248° with decomposition) are stirred for 2 hours at 70° together with 16 grams anhydrous potassium carbonate in 260 ccm. dimethylformamide. Then 14 grams chloroacetic acid ethyl ester are allowed to drop in and stired for another 9 hours at 70°. The reaction mixture is filtered off with suction from the inorganic salts and the filtrate concentrated in vacuum to dryness. The residue is dissolved in ethyl acetate and the solution is washed several times with a diluted sodium hydroxide solution. The ethyl acetate layer is then separated and dried. While introducing hydrochloric acid gas the hydrochloride of the reaction product precipitates in the form of colourless needles having a melting point of 222°.

When replacing in the above example the 3-(β-diethylaminoethyl)-4-methyl-7-hydroxy-2-oxo-1, 2-dihydroquinoline used as starting material by the 3-(β-diethylaminopropyl) - 4-methyl-7-hydroxy-2-oxo-1,2-dihydroquinoline and working for the rest as described, the 3-(β-diethylaminopropyl) - 4-methyl-7-ethoxy-carbonylemethoxy-2-oxo-1,2-dihydroquinoline is obtained, its hydrochloride having a melting point of 221–222°.

substituted in 7-position are obtained, which are described in the following table.

| Initial product | | Final product | Melting point, degrees |
|---|---|---|---|
| 3-(β-piperidinoethyl)-4-methyl-7-hydroxy-2-oxo-1,2-dihydroquinoline. | Chloroacetic acid ethyl ester | 3-(β-piperidinoethyl)-4-methyl-7-ethoxycarbonylmethoxy-2-oxo-1,2-dihydroquinoline. | 266 (hydrochloride). |
| 3-(β-diethylaminoethyl)-4-n-propyl-7-hydroxy-2-oxo-1,2-dihydroquinoline. | do | 3-(β-diethylaminoethyl)-4-n-propyl-7-ethoxycarbonylmethoxy-2-oxo-1,2-dihydroquinoline. | 235 (hydrochloride). |
| 3-(β-piperidinoethyl)-4-ethyl-7-hydroxy-2-oxo-1,2-dihydroquinoline. | do | 3-(β-piperidinoethyl)-4-ethyl-7-ethoxycarbonylmethoxy-2-oxo-1,2-dihydroquinoline. | 251 (hydrochloride). |
| 3-(β-piperidinoethyl)-4-ethyl-7-hydroxy-8-bromo-2-oxo-1,2-dihydroquinoline. | do | 3-(β-piperidinoethyl)-4-ethyl-7-ethoxycarbonylmethoxy-8-bromo-2-oxo-1,2-dihydroquinoline. | 207 (hydrochloride). |
| 1-ethyl-3-(β-piperidinoethyl)-4-ethyl-7-hydroxy-8-bromo-2-oxo-1,2-dihydroquinoline. | do | 1-ethyl-3-(β-piperidinoethyl)-4-ethyl-7-ethoxycarbonylmethoxy-8-bromo-2-oxo-1,2-dihydroquinoline. | 232 (hydrochloride). |
| 1-methyl-3-(β-piperidinoethyl)-4-ethyl-7-hydroxy-8-bromo-2-oxo-1,2-dihydroquinoline. | do | 1-methyl-3-(β-piperidinoethyl)-4-ethyl-7-ethoxycarbonylmethoxy-8-bromo-2-oxo-1,2-dihydroquinoline. | 232 (hydrochloride). |
| 3-(β-piperidinoethyl)-4-n-propyl-7-hydroxy-8-bromo-2-oxo-1,2-dihydroquinoline. | do | 3-(β-piperidinoethyl)-4-n-propyl-7-ethoxycarbonylmethoxy-8-bromo-2-oxo-1,2-dihydroquinoline. | 209 (hydrochloride). |
| 3-(β-dimethylaminoethyl)-4-methyl-7-hydroxy-2-oxo-1,2-dihydroquinoline. | do | 3-(β-dimethylaminoethyl)-4-methyl-7-ethoxycarbonylmethoxy-2-oxo-1,2-dihydroquinoline. | 255 (hydrochloride). |
| 3-(γ-dimethylamino-β-methyl-propyl)-4-methyl-7-hydroxy-2-oxo-1,2-dihydroquinoline. | do | 3-(γ-dimethylamino-β-methyl-propyl)-4-methyl-7-ethoxycarbonylmethoxy-2-oxo-1,2-dihydroquinoline. | 198 (hydrochloride). |
| 3-(β-diisopropylaminoethyl)-4-methyl-7-hydroxy-2-oxo-1,2-dihydroquinoline. | do | 3-(β-diisopropylaminoethyl)-4-methyl-7-ethoxycarbonylmethyl-2-ox-1,2-dihydroquinoline. | 130 decomposition (hydrochloride). |
| 3-(β-pyrrolidinoethyl)-4-methyl-7-hydroxy-2-oxo-1,2-dihydroquinoline. | do | 3-(β-pyrrolidinoethyl)-4-methyl-7-ethoxycarbonylmethoxy-2-oxo-1,2-dihydroquinoline. | 258 (hydrochloride). |
| 3-[β-(pyridyl-2)-ethyl]-4-methyl-7-hydroxy-2-oxo-1,2-dihydroquinoline. | do | 3-[β-(pyridyl-2)-ethyl]-4-methyl-7-ethoxycarbonylmethoxy-2-oxo-1,2-dihydroquinoline. | 215 (hydrochloride). |
| 3-[β-(pyridyl-4)-ethyl]-4-methyl-7-hydroxy-2-oxo-1,2-dihydroquinoline. | do | 3-[β-(pyridyl-4)-ethyl]-4-methyl-7-ethoxycarbonylmethoxy-2-oxo-1,2-dihydroquinoline. | 244 (hydrochloride). |
| 3-[β-(1-methylpiperidyl(2)-)ethyl/-4-methyl-7-hydroxy-2-oxo-1,2-dihydroquinoline. | do | 3-[β-(1-methylpiperidyl(2)-)-ethyl]-4-methyl-7-ethoxycarbonylmethoxy-2-oxo-1,2-dihydroquinoline. | 186 (base). |
| 3-(γ-diethylaminopropyl)-4-methyl-7-hydroxy-2-oxo-1,2-dihydroquinoline. | do | 3-(γ-diethylaminopropyl)-4-methyl-7-ethoxycarbonylmethoxy-2-oxo-1,2-dihydroquinoline. | 110 decomposition (hydrochloride). |
| 3-(β-morpholinoethyl)-4-methyl-7-hydroxy-2-oxo-1,2-dihydroquinoline. | do | 3-(β-morpholinoethyl)-4-methyl-7-ethoxycarbonylmethoxy-2-oxo-1,2-dihydroquinoline. | 248 (hydrochloride). |
| 1-methyl-3-(β-piperidinoethyl)-4-methyl-7-hydroxy-2-oxo-1,2-dihydroquinoline. | do | 1-methyl-3-(β-piperidinoethyl)-4-methyl-7-ethoxycarbonylmethoxy-2-oxo-1,2-dihydroquinoline. | 182 (hydrochloride). |
| 3-(β-diethylaminoethyl)-4-methyl-7-hydroxy-2-oxo-1,2-dihydroquinoline. | Chloroacetic acid isopropylester | 3-(β-diethylaminoethyl)-4-methyl-7-isopropoxycarbonylmethoxy-2-oxo-1,2-dihydroquinoline. | 237 (hydrochloride). |
| 3-(β-diethylaminoethyl)-4-methyl-7-hydroxy-2-oxo-1,2-dihydroquinoline. | Chloroacetic acid isobutylester | 3-(β-diethylaminoethyl)-4-methyl-7-isobutoxycarbonylmethoxy-2-oxo-1,2-dihydroquinoline. | 221 (hydrochloride). |

EXAMPLE 2

27.4 grams 3 - (β-diethylaminoethyl)-4-methyl-7-hydroxy-2-oxo-1,2 dihydroquinoline are reacted in 200 ccm. dimethylformamide with 14 grams allylbromide after addition of 16 grams anhydrous potassium carbonate according to the method as described in Example 1. The reaction product obtained in the form of its hydrochloride is recrystallized for further purification from a mixture of ethyl acetate and methanol.

Melting point of the recrystallized hydrochloride: 233°.

EXAMPLE 3

When reacting the below-mentioned 7-hydroxy-2-oxo-1-2-dihydroquinoline derivatives in the manner as indicated in Example 1 the corresponding derivatives being

EXAMPLE 4

31 grams 1-ethyl-3-(β-piperidinoethyl)-4-methyl-7-hydroxy-2-oxo-1,2-dihydroquinoline are suspended in 280 ccm. toluene. 5.4 grams sodium methylate are then added and the mixture is stirred for 2 hours at 70°. 15 grams chloroacetic acid ethyl ester are subsequently allowed to drop in and it is stirred for another 8 hours at 70°. The reaction mixture is filtered off with suction from the precipitated inorganic salts and the filtrate is concentrated in vacuum to dryness. The residue is dissolved in methylene chloride and the solution is washed several times with a diluted sodium hydroxide solution. By introduction of hydrochloric acid gas into the dried methylene chloride solution the hydrochloride of the 1-ethyl-3-(β-piperidinoethyl) - 4 - methyl-7-ethoxycarbonylmethoxy-2-oxo-1,2-dihydroquinoline having a melting point of 170° is precipitated. Yield: 16 grams.

EXAMPLE 5

18.5 grams 3-(β-diethylaminoethyl) - 4 - phenyl-7-hydroxy-2-oxo-1,2-dihydroquinoline and 9.5 grams anhydrous potassium carbonate are suspended in 200 ccm. diethylformamide and are stirred for 2 hours at 70°. 9 grams chloroacetic acid ethyl ester are then allowed to drop in and it is stirred for another 8 hours at 70°. The reaction mixture is now filtered off with suction, while hot, and the filtrate is concentrated in vacuum to dryness. The residue is dissolved in ethyl acetate and this solution is washed several times with diluted sodium hydroxide solution. By introduction of etherous hydrochloric acid into the dried ethyl acetate solution the hydrochloride of the 3-(β-diethylaminoethyl) - 4 - phenyl-7-ethoxycarbonylmethoxy-2-oxo-1,2-dihydroquinoline is precipitated. For further purification the raw product is recrystallized from a mixture of alcohol and methyl ethyl ketone (1:2). Melting point of the hydrochloride: 229°. Yield: 8.5 grams.

EXAMPLE 6

27.4 grams 3-(β - diethylaminoethyl)-4-methyl-7-hydroxy-2-oxo-1,2-dihydroquinoline are suspended in 250 ccm. dimethylformamide and are stirred after the addition of 16 grams anhydrous potassium carbonate for 2 hours at 70°. 21 grams α-bromopropionic acid ethyl ester are then allowed to slowly drop in. The reaction mixture is stirred for another 8 hours at 70° and it is filtered off with suction, while hot. The isolation of the hydrochloride of the reaction product can be made as described in Example 5. Thus, 12.5 grams of the 3-(β-dimethylaminoethyl)-4-methyl - 7 - (α-ethoxycarbonylethoxy)-2-oxo-1,2-dihydroquinoline hydrochloride having a melting point of 184° are obtained.

EXAMPLE 7

(a) 34.5 grams of 3-(β-diethylaminoethyl)-4-methyl-7-hydroxy-8-chloro-2-oxo-1,2-dihydroquinoline hydrochloride and 28 grams anhydrous potassium carbonate are suspended in 300 ccm. dimethylformamide and stirred for about 2 hours at 70–80°. 16 grams chloroacetic acid ethyl ester are then allowed to drop in and it is stirred for another 6 hours at 70–80°. While hot, the reaction mixture is filtered off with suction from the potassium chloride and concentrated in vacuum to dryness. The residue is digested with ethyl acetate whereby the raw base which remains is filtered off with suction and dried. It is then dissolved in dimethylformamide and the solution is filtered. By introduction of hydrochloric acid gas into the filtered solution, the hydrochloride of the 3-(β-diethylaminoethyl) - 4 - methyl - 7 - ethoxycarbonylmethoxy - 8-chloro-2-oxo-1,2-dihydroquinoline having a melting point of 220–222° is precipitated. Yield: 20 grams.

When using in the above example instead of 16 grams chloroacetic acid ethyl ester 14 grams allylbromide, the 3-(β-diethylaminoethyl)-4-methyl - 7 - allyloxy-8-chloro-2-oxo-1,2-dihydroquinoline hydrochloride is obtained in the form of colourless crystals having a melting point of 189° (after recrystallization from methanol:water=1:1).

(b) The 3-(β - diethylaminoethyl)-4-methyl-7-hydroxy-8-chloro-2-oxo-1,2-dihydroquinoline hydrochloride used as starting material can be obtained in the following manner:

A soft current of chlorine gas is introduced at 10–20° into a solution of 27.4 grams 3-(β-diethylaminoethyl)-4-methyl-7-hydroxy-2-oxo-1,2-dihydroquinoline (having a melting point of 248° with decomposition) in 274 ccm. glacial acetic acid. After about 1 hour the reaction mixture solidifies to a colourless crystal paste. It is filtered off with suction and the residue is washed with some glacial acetic acid and ether and then dried. The reaction product crystallized from methanol in the form of colourless needles having a melting point of 300° with decomposition.

Analysis.—Calc'd for $C_{16}H_{21}O_2N_2Cl \cdot HCl$ (percent): Cl=20.6; N=8.1. Found percent: Cl=19.35; N=7.85.

EXAMPLE 8

(a) 43.4 grams 3-(β-diethylaminoethyl)-4-methyl-7-hydroxy-8-bromo - 2 - oxo-1,2-dihydroquinoline hydrobromide are suspended in 300 ccm. dimethylformamide and, after the addition of 30 grams anhydrous potassium carbonate, are subsequently stirred for 2 hours at 70–80°. Then 16 grams chloroacetic acid ethyl ester are allowed to drop in and the reaction mixture is stirred for another 10 hours at 70–80°. The reaction product is filtered off with suction, while hot, and the filtrate is concentrated in vacuum to dryness. The residue is recrystallized from methanol whereby the 3-(β-diethylaminoethyl)-4-methyl-7-ethoxycarbonylmethoxy-8-bromo - 2 - oxo-1,2-dihydroquinoline is obtained in colourless crystals having a melting point of 143–145°.

Analysis. — Calc'd for $C_{20}H_{27}O_4N_2Br$ (percent): C=54.65; H=6.15; Br=18.23. Found (percent): C=54.38; H=6.3; Br=18.06.

(b) The 3-(β-diethylaminoethyl)-4-methyl-7-hydroxy-8-bromo-2-oxo-1,2-dihydroquinoline hydrobromide used as starting material can be obtained as follows: 27.4 grams 3 - (β-diethylaminoethyl) - 4 - methyl - 7 - hydroxy-2-oxo-1,2-dihydroquinoline are dissolved at room temperature in 274 ccm. glacial acetic acid. Then 17 grams gromine dissolved in 100 ccm. glacial acetic acid

| Initial product | | Final product | Melting point of the hydrochloride, degrees |
|---|---|---|---|
| 3-(β-diethylaminoethyl)-4-methyl-7-hydroxy-8-bromo-2-oxo-1,2-dihydroquinoline hydrobromide. | Allylbromide | 3-(β-diethylaminoethyl)-4-methyl-7-allyloxy-8-bromo-2-oxo-1,2-dihydroquinoline. | 200 |
| 1-methyl-3-(β-diethylaminoethyl)-4-methyl-7-hydroxy-8-bromo-2-oxo-1,2-dihydroquinoline. | Chloroacetic acid ester | 1-methyl-3-(β-diethylaminoethyl)-4-methyl-7-ethoxycarbonylmethoxy-8-bromo-2-oxo-1,2-dihydroquinoline. | 196 |
| 3-(β-diethylaminoethyl)-4-methyl-7-hydroxy-8-bromo-2-oxo-1,2-dihydroquinoline. | γ-bromopropionicacid ethylester | 3-(β-diethylaminoethyl)-4-methyl-7-(α-ethoxycarbonylethoxy)-8-bromo-2-oxo-1,2-dihydroquinoline. | 110–111 |
| 1-methyl-3-(β-piperidinoethyl)-4-methyl-7-hydroxy-8-bromo-2-oxo-1,2-dihydroquinoline. | Chloroacetic acid ethyl ester | 1-methyl-3-(β-piperidinoethyl)-4-methyl-7-ethoxycarbonylmethoxy-8-bromo-2-oxo-1,2-dihydroquinoline. | 212 |
| 3-(γ-dimethylaminoisobutyl)-4-methyl-7-hydroxy-8-bromo-2-oxo-1,2-dihydroquinoline. | do | 3-(γ-dimethylaminoisobutyl)-4-methyl-7-ethoxycarbonylmethoxy-8-bromo-2-oxo-1,2-dihydroquinoline. | 193 |
| 3-(β-isopropylaminoethyl)-4-methyl-7-hydroxy-8-bromo-2-oxo-1,2-dihydroquinoline. | do | 3-(β-isopropylaminoethyl)-4-methyl-7-ethoxycarbonylmethoxy-8-bromo-2-oxo-1,2-dihydroquinoline. | 170 |
| 3-(β-pyrrolidinoethyl)-4-methyl-7-hydroxy-8-bromo-2-oxo-1,2-dihydroquinoline. | do | 3-(β-pyrrolidinoethyl)-4-methyl-7-ethoxycarbonylmethoxy-8-bromo-2-oxo-1,2-dihydroquinoline. | 228 |
| 3-(β-diethylaminopropyl)-4-methyl-7-hydroxy-8-bromo-2-oxo-1,2-dihydroquinoline. | do | 3-(β-diethylaminopropyl)-4-methyl-7-ethoxycarbonylmethoxy-8-bromo-2-oxo-1,2-dihydroquinoline. | [1] 65 |
| 3-(β-dimethylaminoethyl)-4-methyl-7-hydroxy-8-bromo-2-oxo-1,2-dihydroquinoline. | do | 3-(β-dimethylaminoethyl)-4-methyl-7-ethoxycarbonylmethoxy-8-bromo-2-oxo-1,2-dihydroquinoline. | 220 |
| 3-(γ-diethylaminopropyl)-4-methyl-7-hydroxy-8-bromo-2-oxo-1,2-dihydroquinoline. | do | 3-(γ-diethylaminopropyl)-4-methyl-7-ethoxycarbonylmethoxy-8-bromo-2-oxo-1,2-dihydroquinoline. | 191 |

[1] With decomposition.

are allowed to drop in at a temperature of 20–30°. The reaction mixture is stirred for another hour at 60–70° whereby the hydrobromide, even while hot, precipitates in the form of nearly colourless crystals. After cooling, the reaction product is filtered off with suction and dried. The bromination product obtained possesses a melting point of 263–265° with decomposition.

*Analysis.*—Calc'd for $C_{16}H_{22}O_2N_2Br.HBr$. (percent): Br=36.87. Found (percent): Br=36.53.

According to the prescription given under (a) the derivatives substituted in 7-position as described in the table hereinafter may be obtained by reacting the following 7-hydroxy-2-oxo-1,2-dihydroquinoline derivatives as indicated.

EXAMPLE 9

(a) 51.3 grams 3-($\beta$-diethylaminoethyl)-4-methyl-6,8-dibromo-7-hydroxy-2-oxo-1,2-dihydroquinoline hydrobromide and 28 grams anhydrous potassium carbonate are suspended in 300 ccm. dimethylformamide and the mixture is stirred for 2–3 hours while heated up to 70–80°. 16 grams chloroacetic acid ethyl ester are then allowed to slowly drop into the reaction mixture which is stirred for another 10 hours at 70–80°. Then the inorganic salts are filtered off with suction, while hot, and the dimethylformamide filtrate is concentrated in vacuum almost to dryness. When digesting the partially crystallized residue with ethyl acetate the 3-($\beta$-diethylaminoethyl)-4-methyl-6,8 - dibromo - 7 - ethoxycarbonylmethoxy - 2 - oxo - 1,2-dihydroquinoline remains in the form of a pale yellowish substance having, after repeated recrystallization from ethyl acetate, a melting point of 177–178°. Its hydrochloride forms colourless crystals having a melting point of 202–203°.

(b) The starting material can be obtained as follows: 24.4 grams 3-($\beta$-diethylaminoethyl)-4-methyl-7-hydroxy-2-oxo-1,2-dihydroquinoline are dissolved at room temperature in 900 ccm. glacial acetic acid. Then 40 grams bromine dissolved in 100 ccm. glacial acetic acid are allowed to drop into the reaction mixture at 20–30° while vigorously stirring, stirring is continued for another 1–2 hours at 20–30° and a further 2 hours at boiling temperature. After cooling the reaction product which partially solidifies, even while warm, is filtered off with suction, washed with glacial acetic acid and acetone and dried. Thus, the 3-($\beta$-diethylaminoethyl)-4-methyl-6,8-dibromo-7-hydroxy - 2 - oxo-1,2-dihydroquinoline hydrobromide is obtained in a yield of 96%. After recrystallization from dimethylformamide it forms colourless crystals of a melting point of 255–257° with decomposition.

EXAMPLE 10

(a) 10.5 grams 1-methyl-3-($\beta$-diethylaminoethyl)-4-methyl - 7 - hydroxy - 8 - chloro - 2 - oxo - 1,2 - dihydroquinoline hydrochloride and 10 grams anhydrous potassium carbonate are suspended in 100 ccm. dimethylformamide and stirred at 70° for 2 hours. Then 4.5 grams of chloroacetic acid ethyl ester are allowed to drop in and it is stirred for another 7 hours at 70°. The reaction mixture is filtered off with suction and the filtrate concentrated in vacuum to dryness. The raw product is dissolved in ethyl acetate and washed several times with diluted sodium hydroxide solution. By introduction of hydrochloric acid gas into the dried ethyl acetate solution, the reaction product precipitates in the form of its hydrochloride having a melting point of 135°. Yield: 6.2 grams.

(b) The 1-methyl-3-($\beta$-diethylaminoethyl)-7-hydroxy-8-chloro-2-oxo-1,2-dihydroquinoline hydrochloride can be produced in the following manner: 20 grams sulphurylchloride are softly added at room temperature to 31.5 grams 1 - methyl - 3 - ($\beta$ - diethylaminoethyl)-4-methyl-7-hydroxy-2-oxo-1,2-dihydroquinoline hydrochloride having a melting point of 258°—obtainable according to known methods by condensation of $\beta$-diethylaminoethyl-acetoacetic acid ester with N-methyl-m-aminophenol—being suspended in 500 ccm. glacial acetic acid. The reaction mixture is stirred for about 3 hours at 40–50°. Then the glacial acetic acid is distilled off under reduced pressure, the semisolid residue digested, while cold, with about 300 ccm. acetone, the remaining chlorination product filtered off with suction and the residue recrystallized from dimethylformamide. The reaction product forms colourless crystals having a melting point of 266–268° (with decomposition).

EXAMPLE 11

22 grams 3-($\beta$-piperidinoethyl)-4-methyl-7-hydroxy-8-bromo-2-oxo-1,2-dihydroquinoline hydrobromide and 15 grams anhydrous potassium carbonate are stirred in 150 ccm. dimethylformamide for 2 hours at 70°. 8 grams chloroacetic acid ethyl ester are allowed to drop in during a period of 4 hours and the mixture is then stirred for another 5 hours at 70°. The reaction mixture is filtered off with suction, while hot, and the filtrate is concentrated in vacuum to dryness. The resulting residue is dissolved in methylene chloride and the solution is washed several times with diluted sodium hydroxide solution for removal of the unreacted starting material. By introduction of hydrochloric acid gas into the dried methylene chloride solution the hydrochloride of the 3-($\beta$-piperidinoethyl)-4-methyl - 7 - ethoxycarbonylmethoxy-8-bromo-2-oxo-1,2-dihydroquinoline having a melting point of 204° precipitates. Yield: 14 grams.

When using in the the above example as a starting material instead of the 3-($\beta$-piperidinoethyl)-4-methyl-7-hydroxy-8-bromo-2-oxo-1,2-dihydroquinoline hydrobromide an equivalent quantity of the 3-($\beta$-morpholinoethyl)-4-methyl-7-hydroxy-8-bromo-2-oxo - 1,2 - dihydroquinoline hydrobromide, the 3-($\beta$-morpholinoethyl) - 4 - methyl-7-ethoxycarbonylmethoxy - 8 - bromo-2 - oxo - 1,2-dihydroquinoline is obtained in a good yield, its hydrochloride having a melting point of 231°.

EXAMPLE 12

24 grams 1-ethyl-3-($\beta$-piperidinoethyl)-4-methyl-7-hydroxy-8-bromo-2-oxo-1,2-dihydroquinoline hydrobromide and 15 grams anhydrous potassium carbonate are suspended in 200 ccm. methyl ethyl ketone. This mixture is stirred for 2 hours at 70° and then 8 grams chloroacetic acid ethyl ester are allowed to slowly drop in at this temperature. To complete the reaction stirring is continued for another 8 hours at 70°. The reaction mixture is filtered off with suction, while hot, and the filtrate is concentrated in vacuum to dryness. The resulting residue is dissolved in methylene chloride and the solution is washed several times with diluted sodium hydroxide solution. By introducing hydrochloric acid gas into the methylene chloride solution the hydrochloride of the 1-ethyl-3-($\beta$-piperidinoethyl) - 4 - methyl-7-ethoxycarbonylmethoxy-8-bromo-2-oxo-1,2-dihydroquinoline having a melting point at 206° precipitates. Yield: 10 grams.

When reacting in an analogous manner equivalent quantities of the 1-ethyl-3-($\beta$-diethylaminoethyl)-4-methyl-7-hydroxy-8-bromo-2-oxo-1,2-dihydroquinoline hydrobromide with chloroacetic acid ethyl ester, the 1-ethyl-3-($\beta$-diethylaminoethyl)- 4 -methyl-7-ethoxycarbonylmethoxy-8-bromo-2-oxo-1,2-dihydroquinoline is obtained, its hydrochloride having a melting point of 172°.

What is claimed is:
1. A compound of the formula

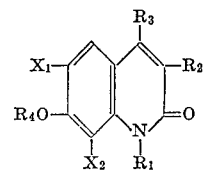

wherein $R_1$ is selected from the group consisting of hydrogen, methyl and ethyl;

$R_2$ is selected from the group consisting of β-piperidinoethyl, β-morpholinoethyl, β-pyrolidinyl, β-N-methylpiperidyl(2)-ethyl, -(pyridyl-2)-ethyl, β-(pyridyl-4)-ethyl and dialkylaminoalkyl having the formula

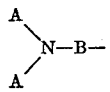

wherein

A is an alkyl group having no more than 3 carbon atoms and

B is an alkylene group having 2–4 carbon atoms;

$R_3$ is selected from the group consisting of methyl, ethyl, propyl and phenyl;

$R_4$ is selected from the group consisting of allyl and alkoxycarbonylalkyl having the formula

wherein D is methylene or ethylene and

E is an alkyl group having 2–4 carbon atoms $X_1$ is hydrogen or bromine and $X_2$ is hydrogen, chlorine or bromine.

2. A compound as claimed in claim 1 wherein $R_1$ is selected from the group consisting of hydrogen and methyl, $R_2$ is selected from the group consisting of diethylaminoethyl, β-piperidinoethyl, morpholinoethyl and β-diethylaminopropyl, $R_3$ is selected from the group consisting of methyl and phenyl, $R_4$ is ethoxycarbonylmethoxy, $X_1$ is hydrogen and $X_2$ is hydrogen, chlorine or bromine.

3. The hydrochlorides of the compounds claimed in claim 1.

4. 3-(β-diethylaminoethyl)-4-methyl-7-ethoxy-carbonylmethoxy-8-chloro-2-oxo-1,2-dihydroquinoline and its hydrochloride.

5. 3-(β-diethylaminoethyl)-4-methyl-7-ethoxycarbonylmethoxy-8-bromo-2-oxo-1,2-dihydroquinoline and its hydrochloride.

6. 3-(β-piperidinoethyl)-4-ethyl-7-ethoxy-carbonylmethoxy-8-bromo-2-oxo-1,2-dihydroquinoline and its hydrochloride.

7. 3-(γ-dimethylaminoisobutyl)-4-methyl-7-ethoxycarbonylmethoxy-8-bromo-2-oxo-1,2-dihydroquinoline and its hydrochloride.

8. 3-(β-piperidinoethyl)-4-propyl-7-ethoxycarbonyl methoxy-8-bromo-2-oxo-1,2-dihydroquinoline and its hydrochloride.

References Cited

UNITED STATES PATENTS

| | | | |
|---|---|---|---|
| 2,754,293 | 7/1956 | Brody et al. | 260—288 X |
| 3,202,661 | 8/1965 | Brust et al. | 260—288 |
| 3,210,358 | 10/1965 | Pfister et al. | 260—288 |
| 3,419,563 | 12/1968 | Knupfer et al. | 260—288 |

DONALD G. DAUS, Primary Examiner

U.S. Cl. X.R.

260—247.2, 288, 286, 574, 482, 294, 295, 289, 247.7, 326.8, 694; 429—248, 258